(12) United States Patent
Kim et al.

(10) Patent No.: US 6,385,390 B1
(45) Date of Patent: May 7, 2002

(54) HI-FI AUDIO SIGNAL RECORDING/PLAYBACK APPARATUS USING VIDEO HEADS

(75) Inventors: Chul-min Kim, Anyang; Ik-kyung Shin; Yong-jin Kang, both of Suwon, all of (KR)

(73) Assignee: SamSung Electronics, Co., Ltd., Suwon (KR)

( * ) Notice: Subject to any disclaimer, the term of this patent is extended or adjusted under 35 U.S.C. 154(b) by 0 days.

(21) Appl. No.: 09/267,649

(22) Filed: Mar. 15, 1999

(30) Foreign Application Priority Data

Mar. 14, 1998 (KR) ............................................. 98-8645

(51) Int. Cl.[7] ................................................. H04N 5/91
(52) U.S. Cl. ............................. 386/96; 386/46; 386/99
(58) Field of Search ............................. 386/26, 29, 32, 386/39, 46, 95, 96, 97, 98, 99, 100, 101, 102, 103, 104, 105, 106, 107; H04N 5/91

(56) References Cited

U.S. PATENT DOCUMENTS

| 4,464,684 A | * | 8/1984 | Kluth | ........................... 386/39 |
| 4,477,840 A | | 10/1984 | Kluth | |
| 4,542,418 A | | 9/1985 | Yoneyama et al. | |
| 4,698,693 A | * | 10/1987 | Ishigaki et al. | ................. 386/29 |
| 4,709,275 A | | 11/1987 | Fukuda | |
| 4,752,832 A | | 6/1988 | Higurashi | |
| 4,757,394 A | | 7/1988 | Okamoto et al. | |
| 4,758,903 A | | 7/1988 | Noguchi et al. | |
| 5,337,192 A | | 8/1994 | Fukasawa et al. | |
| 5,392,165 A | | 2/1995 | Hosono et al. | |
| 5,572,331 A | | 11/1996 | Yu | |

FOREIGN PATENT DOCUMENTS

| DE | 3113862 | * | 6/1981 | ................... 386/29 |
| EP | 0 177 235 A1 | | 4/1986 | |
| GB | 2113894 A | * | 8/1983 | ................... 386/29 |
| WO | WO91/07846 | | 5/1991 | |

* cited by examiner

Primary Examiner—Vincent F. Boccio
(74) Attorney, Agent, or Firm—Robert E. Bushnell, Esq.

(57) ABSTRACT

A high fidelity (Hi-Fi) audio signal recording/playback apparatus in which a Hi-Fi audio signal is recorded/reproduced using video heads without an extra Hi-Fi audio head. In the Hi-Fi audio signal recording/playback apparatus, the Hi-Fi audio signal is recorded and reproduced together with the video signal using the same 2-channel head and the same pre-amplifier, without an extra head and pre-amplifier for only a Hi-Fi audio signal, thereby markedly lowering the manufacturing cost.

20 Claims, 5 Drawing Sheets

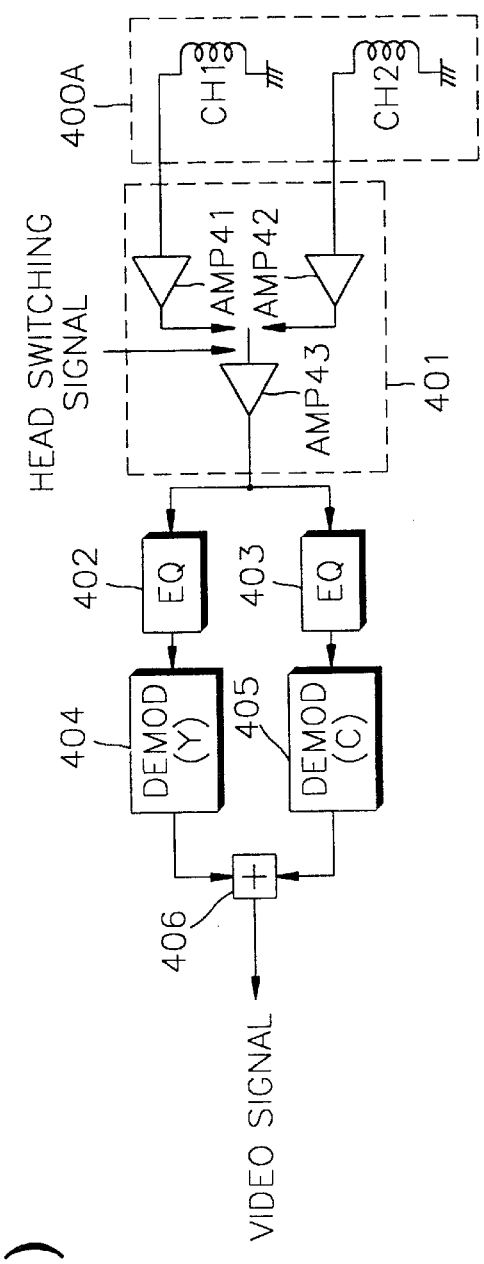
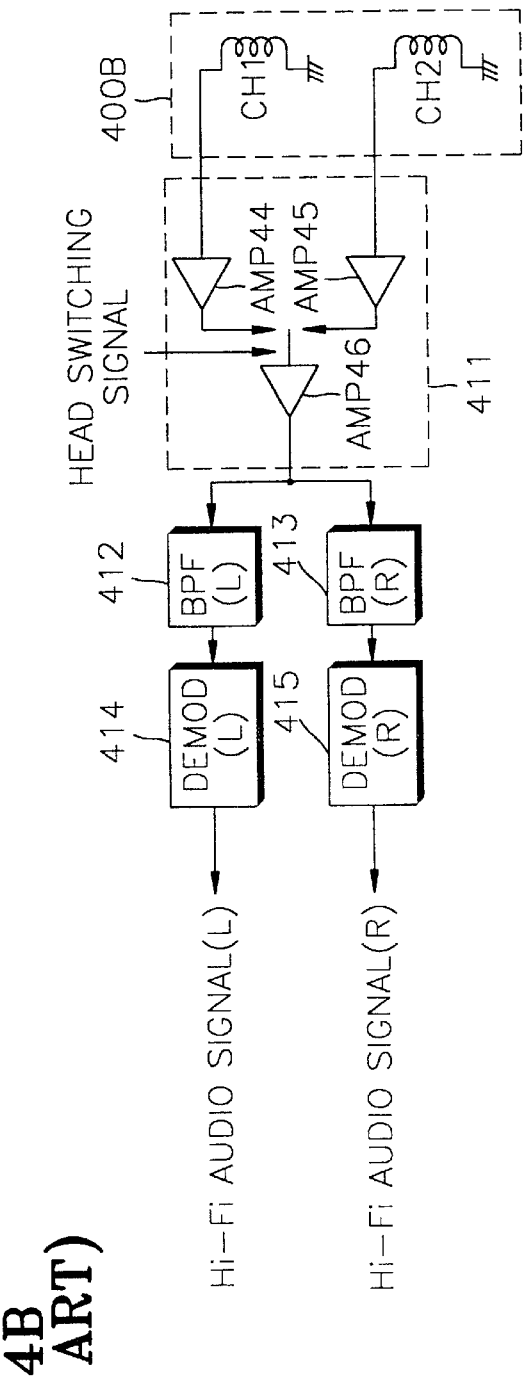
FIG. 4A
(PRIOR ART)
FIG. 4B
(PRIOR ART)

HI-FI AUDIO SIGNAL RECORDING/PLAYBACK APPARATUS USING VIDEO HEADS

CLAIM OF PRIORITY

This application makes reference to, incorporates the same herein, and claims all benefits accruing under 35 U.S.C §119 from an application entitled Hi-Fi audio Signal Recording/Playback Apparatus Using Video Heads earlier filed in the Korean industrial Property Office on Mar. 14, 1998, and there duly assigned Ser. No. 98-8645 by that Office.

BACKGROUND OF THE INVENTION

1. Field of the Invention

The present invention relates to an image and audio signal recording/playback apparatus, and more particularly, to a high fidelity (Hi-Fi) audio signal recording/playback apparatus in which a Hi-Fi audio signal is recorded and reproduced using conventional video heads, not using an extra Hi-Fi audio head.

2. Description of the Related Art

In a VHS type Hi-Fi video cassette recorder (VCR), a Hi-Fi audio head is attached to a drum with a video head, such that it is able to move along the same circumference of a circle together with the video heads. The Hi-Fi audio heads modulate the frequency of an audio signal to record the modulated signal on an embedded layer of a video track, and reads the Hi-Fi audio signal recorded in-depth on the video track.

Thus, an audio signal is recorded on a sound track by a conventional fixed audio head and a frequency-modulated (FM) audio signal is recorded in the embedded layer of the video track by a Hi-Fi audio head. Also, a video signal is recorded in a top layer of the same video track, which is shown in FIG. 1. However, to be exact a color signal of the signals recorded by the video head has a low frequency, so the color signal is recorded upto the deep layer, as shown in FIG. 2A. However, because the level of the color signal to be recorded is lower than that of a luminance signal by approximately 10 dB or more, the recorded color signal is not able to erase the Hi-Fi audio signal recorded in the deep layer as shown in FIG. 2B.

FIGS. 3A and 3B show the structure of a video/Hi-Fi audio signal recording apparatus of a conventional Hi-Fi audio VCR. In the case of a Hi-Fi stereo audio system adopting two channels, a frequency-modulated carrier signal for the left channel (L) (1.3 MHz) is different than that for the right channel (R) (1.7 MHz). Thus, for the recording of a Hi-Fi signal (see FIG. 3B), the modulated Hi-Fi signals from the L and R channels are mixed by a mixer 304, and then amplified by a preamplifier 305 only for a Hi-Fi audio signal to the level required for recording. Then, the mixed Hi-Fi audio signal is recorded in the embedded layer of the video track by a head 306 only for a Hi-Fi audio signal, which is attached to a drum.

Then, for the recording of a video signal (see FIG. 3A), an FM luminance signal Y and a color signal C converted to a low frequency band are mixed by a mixer 301, and then amplified by a video pre-amplifier 302 to the level required for the recording. Then, the amplified video signal is recorded in the top layer of the video track by video heads 303 attached to the drum.

As shown in FIGS. 4A and 4B, which show the structure of a video/Hi-Fi audio playback apparatus of the conventional Hi-Fi audio VCR, for the playback, the video signal and the Hi-Fi audio signal recorded on the video track are read by video heads 400A and Hi-Fi audio heads 400B and then amplified by a video pre-amplifier 401 and a Hi-Fi audio pre-amplifier 411, respectively. Then, the amplified video signal is demodulated through equalizers (EQs) 402 and 403 and demodulators (DEMODs) 404 and 405, and the demodulated video signals passed through the demodulators 404 and 405 are mixed by a mixer 406 to playback the video signal. Also, the Hi-Fi audio signal is divided for L and R channels by band pass filters (BPFs) 412 and 413, and then demodulated by demodulators (DEMODs) 414 and 415, respectively.

As described above, the conventional VCR requires an additional pre-amplifier as well as an additional head only for a Hi-Fi audio signal, besides the video head attached to a drum, for the record/playback of a Hi-Fi audio signal, thereby increasing the manufacturing cost. In particular, the expensive head for only a Hi-Fi audio signal attached to the drum and increased man-hour for the assembly process increase the manufacturing cost.

Examples of convention audio and video recording devices, incorporated herein by reference, are found in U.S. Pat. No. 4,752,832 to Seiji Higurashi entitled Vide And Audio Signal Recording And/Or Reproducing Apparatus, U.S. Pat. No. 4,757,394 to Kaneyuki Okamoto et al entitled Auto-Tracking Apparatus Of A Magnetic Recording/ Reproducing Apparatus, U.S. Pat. No. 4,758,903 to Takaharu Noguchi et al. entitled Apparatus For Recording And Reproducing Video Signal and Digital Signal Other Than Video Signal, U.S. Pat. No. 5,392,165 to Yukiharu Hosono et al. entitled Apparatus For Recording audio And Video Signal, and U.S. Pat. No. 5,572,331 to Jae-cheon Yu entitled Video Signal Recording Format, Deep Recording/ Reproducing Apparatus And Method Therefor.

SUMMARY OF THE INVENTION

To solve the above problems, it is an object of the present invention to provide a high fidelity (Hi-Fi) audio recording apparatus capable of recording a Hi-Fi audio signal using a video head without the need for a head only for a Hi-Fi audio signal.

It is another object of the present invention to provide a Hi-Fi audio playback apparatus capable of reproducing a Hi-Fi audio signal using a video head without the need for a head only for a Hi-Fi audio signal.

To achieve the first object of the present invention, there is provided an apparatus for recording a modulated video signal and a modulated high fidelity (Hi-Fi) audio signal using video heads, comprising: a mixer for mixing the modulated video signal and the modulated Hi-Fi audio signal to output a mixed video/audio signal to be recorded; a recording amplifier for receiving the mixed video/audio signal and amplifying the mixed video/audio signal with a predetermined gain to output a recording current required for the recording; and heads for generating a magnetic field by receiving the recording current to simultaneously record the video signal and the Hi-Fi audio signal on a video track.

To achieve the second object of the present invention, there is provided an apparatus for reproducing a video signal and a high fidelity (Hi-Fi) audio signal recorded on a video track of a recording medium using the same heads, comprising: heads for simultaneously reading the video signal and the Hi-Fi audio signal recorded on the video track; a switching amplifying portion for amplifying the video signal and Hi-Fi audio signal read by the head with a predetermined gain, and for switching the result according to a head switching signal; a band pass filtering portion for passing only the Hi-Fi audio signal of the output signal from the switching amplifying portion; a band rejection filtering portion for rejecting the frequency band of the Hi-Fi audio signal of the output signal from the switching amplifying portion; a Hi-Fi audio signal demodulating portion for demodulating the output signal of the band pass filtering portion; and a video signal reproducing portion for separately demodulating a modulated luminance signal and a modulated color signal included in the output signal of the band rejection filtering portion, and for mixing the separately demodulated signals.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 4A and 4B show the structure of a video/Hi-Fi audio signal playback apparatus of the conventional Hi-Fi audio video cassette recorder (VCR);

DESCRIPTION OF THE PREFERRED EMBODIMENTS

Figure 1:
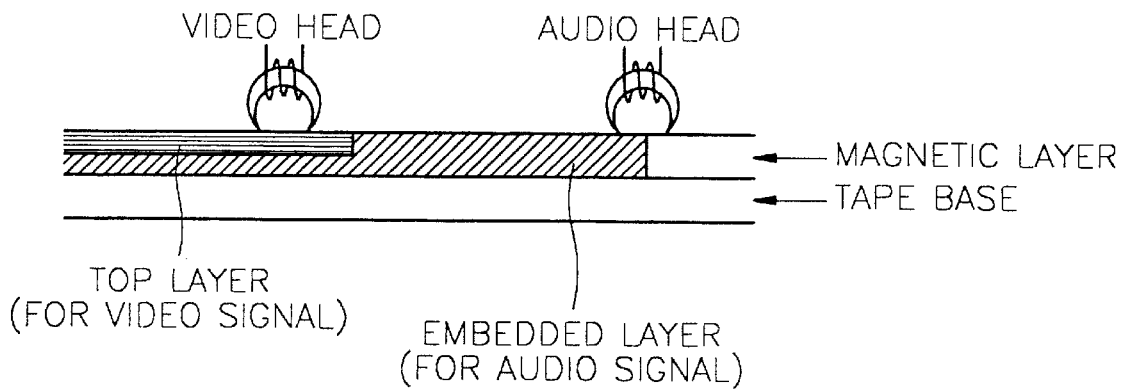
FIG. 1 shows the recording of a high fidelity (Hi-Fi) audio signal on a magnetic layer of a tape.
Figure 2A:
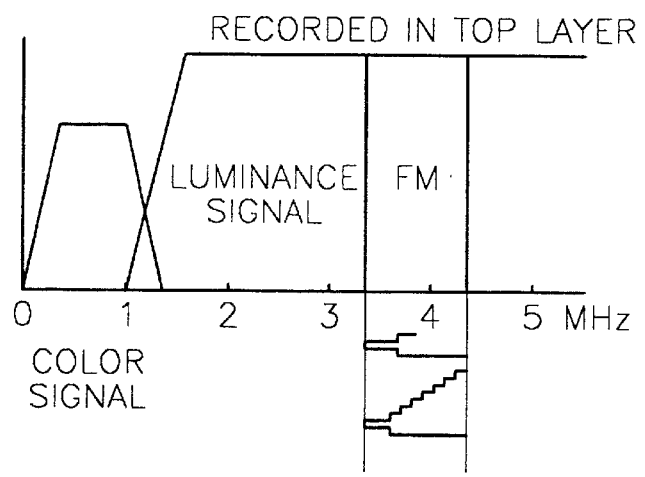
FIGS. 2A and 2B show the frequency characteristics of recorded video and Hi-Fi audio signals, respectively.
Figure 2B:
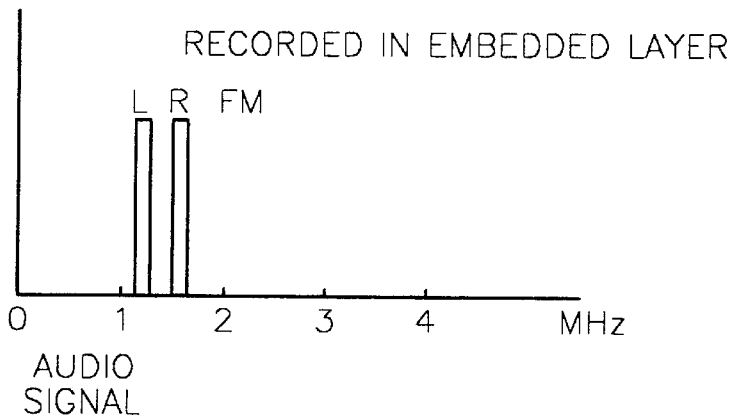
Figure 3A:
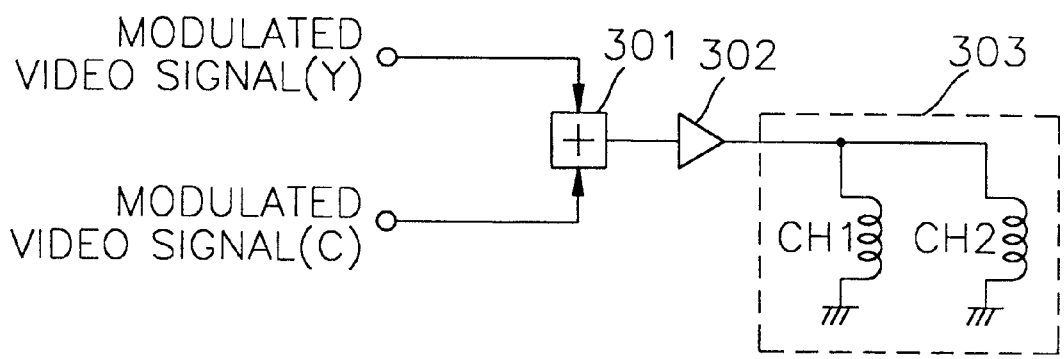
FIGS. 3A and 3B show the structure of a video/Hi-Fi audio signal recording apparatus of a conventional Hi-Fi audio video cassette recorder (VCR)
Figure 3B:
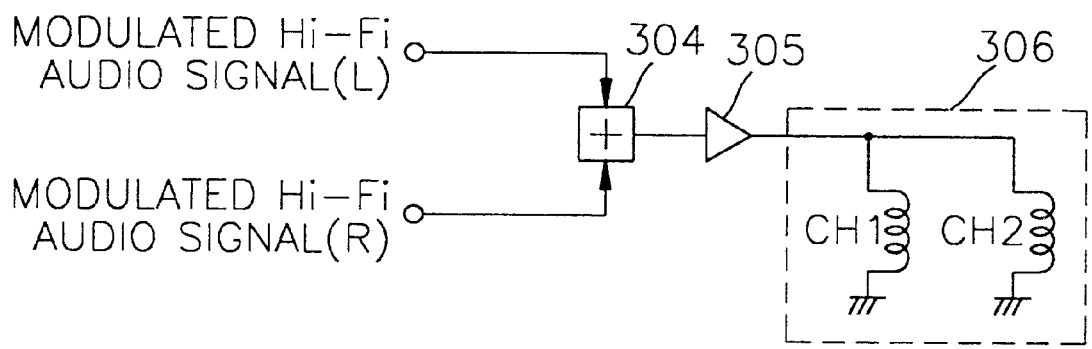
Figure 5:
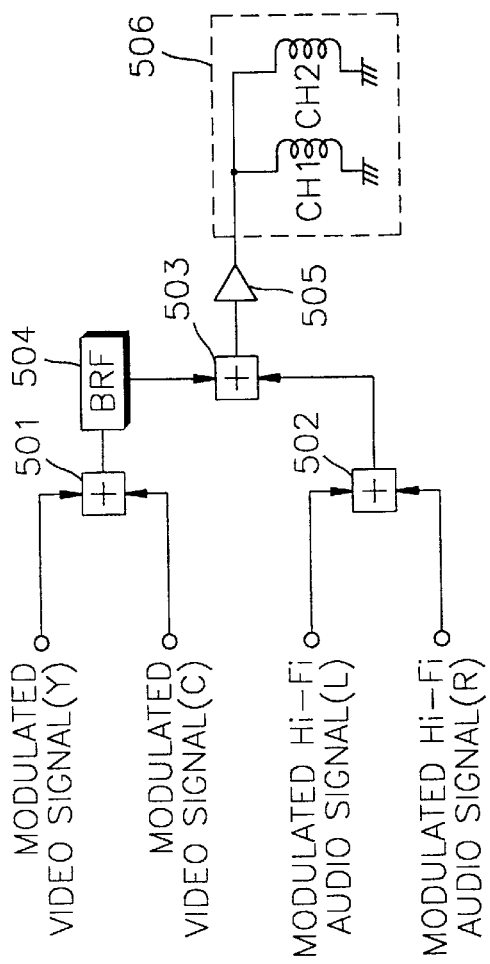
FIG. 5 shows the structure of a Hi-Fi audio signal recording apparatus utilizing video heads according to the present invention.

As shown in FIG. 5, a high fidelity (Hi-Fi) audio signal recording apparatus utilizing video heads according to the present invention includes mixers 501, 502 and 503, a band rejection filter (BRF) 504, a pre-amplifier 505 and common heads 506 which is commonly used for both the video and Hi-Fi audio signals.

When a video signal is input in a recording mode, the video signal is divided into a luminance signal and a color signal while passing through low-pass filters (not shown) and band pass filters (not shown), as well known. Then, the luminance signal is frequency-modulated by a frequency modulator (not shown) to generate a modulated video signal (Y) and the color signal is converted to a low frequency band by a frequency converter (not shown) to generate a modulated video signal (C).

Also, when a Hi-Fi audio signals are input to L and R channels in the recording mode, each audio signal passes through a pre-amplifier (not shown) and a limiter (not shown) and is then modulated by a frequency modulator (not shown) to output modulated Hi-Fi audio signals (L) and (R). Then, the mixer 501 mixes the input modulated video signals (Y) and (C) to output a mixed video signal (Y+C).

The BRF 504 receives the mixed video signal (Y+C) to reject a signal corresponding to the frequency band of the modulated Hi-Fi signal (L+R), which is output from the mixer 502, while passing the signal of the other frequency bands. This is for minimizing interference between the video and Hi-Fi audio signals. The mixer 502 receives and mixes the modulated Hi-Fi audio signals (L) and (R) to output the modulated Hi-Fi audio signal (L+R). Also, the mixer 503 mixes the modulated video signal (Y+C) from which the signal corresponding to the frequency band of the Hi-Fi audio signal has been rejected and the modulated Hi-Fi audio signal (L+R), to output a mixed video and Hi-Fi audio signal (Y+C+L+R) to be recorded. The pre-amplifier 505 receives the signal to be recorded (Y+C+L+R) to amplify the signal to the level suitable for the record. The amplified signal to be recorded (Y+C+L+R) is recorded on a video track of a recording medium by the common heads 506. Here, conventional video heads may be used instead of the common heads 506.

While the Hi-Fi audio signal of the above embodiment is for the L and R channels adopting a two-carrier mode, the Hi-Fi audio signal to be recorded may be a mono Hi-Fi signal for the L or R channel adopting a single-carrier mode.

Figure 7:
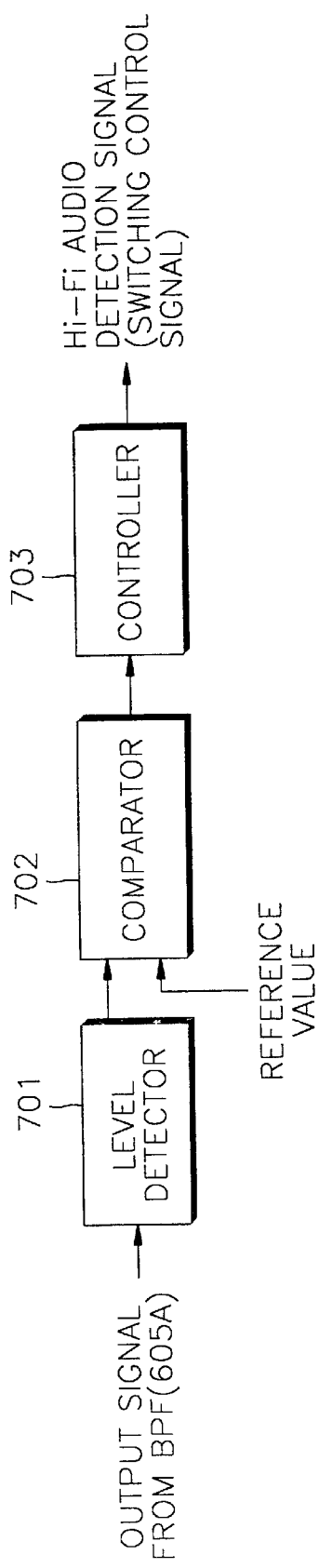
FIG. 7 shows in detail the structure of the switching controller shown in FIG. 6.
Figure 6:
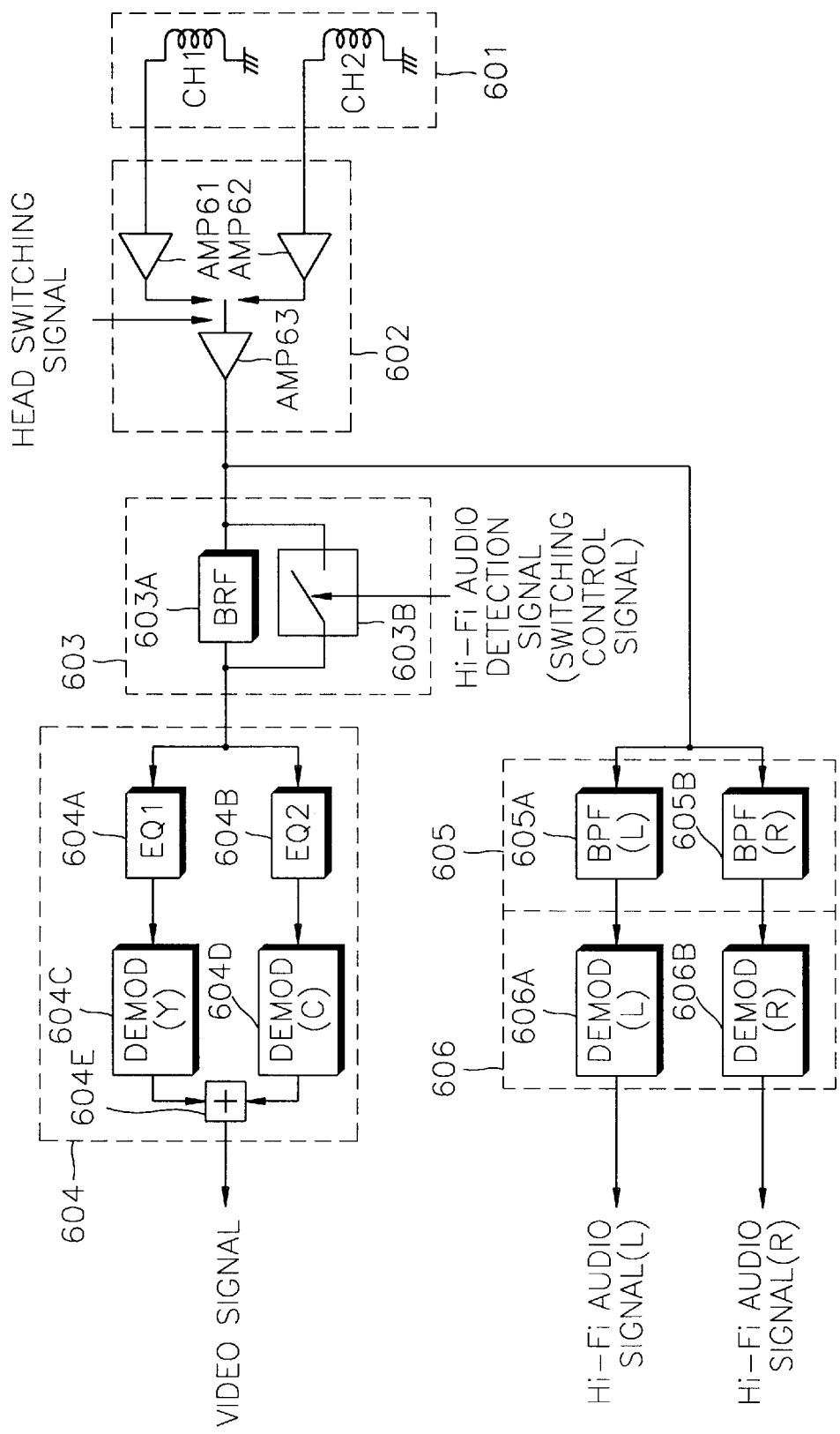
FIG. 6 shows the structure of a Hi-Fi audio signal playback apparatus utilizing video heads according to the present invention.

As shown in FIG. 6, the video/Hi-Fi audio signal playback apparatus includes common heads 601 which are commonly used for both the video and Hi-Fi audio signals, a switching amplifying portion 602, a band rejection filtering portion 603, a video signal reproducing portion 604, a band pass filtering portion 605 and a Hi-Fi audio signal demodulating portion 606. The common heads 601 consist of two heads CH1 and CH2, which may be replaced by conventional video heads. The switching amplifying portion 602 consists of a plurality of amplifiers, e.g., three amplifiers AMP61, AMP62 and AMP63, and is controlled by a head switching signal. The band rejection filtering portion 603 includes a band rejection filter 603A and a switching controller 603B. Also, as shown in FIG. 7, the switching controller 603B includes a level detector 701, a comparator 702 and a controller 703. The video signal reproducing portion 604 includes equalizers (EQ1 and EQ2) 604A and 604B, demodulators (DEMODs) 604C and 604D and a mixer 604E. The band pass filtering portion 605 includes a band pass filter (BPF) 605A for passing a Hi-Fi audio signal of the channel L and a BPF 605B for passing a Hi-Fi audio signal of the channel R. If the Hi-Fi audio signal recorded on the video track is a mono Hi-Fi audio signal of a single carrier, the band pass filtering portion 605 is constructed by a BPF for passing a single carrier. The Hi-Fi audio signal demodulating portion 606 consists of demodulators (DEMODs) 606A and 606B for demodulating Hi-Fi audio signals of the L and R channels, respectively.

In a playback mode, the two heads CH1 and CH2 forming the common heads 601 read both the video and Hi-Fi audio signals recorded on the video track of a tape. The video and Hi-Fi audio signals read by the heads CH1 and CH2 are amplified by the amplifiers AMP61 and AMP62 of the switching amplifying portion 602, and then switched by a head switching signal generated by a micro processor (not shown) to be input to the amplifier AMP63 which amplifies the input video and Hi-Fi audio signals with a predetermined gain. The video/Hi-Fi audio playback signals output from the switching amplifying portion 602 are input to the band rejection filtering portion 603 and the band pass filtering portion 605. The video/Hi-Fi audio playback signals input to the band pass filtering portion 605 is divided into a Hi-Fi audio signal of a carrier of 1.3 MHz of the L channel and a Hi-Fi audio signal of a carrier of 1.7 MHz of the R channel, and the other signal belonging to the frequency band of the video signal is rejected. Then, the demodulators 606A and 606B receives the divided Hi-Fi audio signals of the L and R channels, respectively, to generate Hi-Fi audio playback signals (L) and (R). The BRF 603A of the band rejection filtering portion 603 rejects the signal belonging to the frequency band of the Hi-Fi audio signal, i.e., the Hi-Fi audio signals with center frequencies of 1.3 MHz and 1.7 MHz, and passes the other signal belonging to the frequency band of the video signal, so as to prevent the video signal of the input video/Hi-Fi audio playback signal from being interfered by the Hi-Fi audio signal. The switching controller 603B of the band rejection filtering portion 603 switches off to operate the BRF 603F if the Hi-Fi audio signal is reproduced, and otherwise, switches on not to operate the BRF 603A.

Referring to FIG. 7, the level detector 701 receives the output signal of the BPF 605A or 605B to detect the level of the input signal. In this embodiment, the level of the Hi-Fi audio signal of the L channel is detected to determine whether or not a Hi-Fi audio signal is recorded. The comparator 702 compares the level of the signal detected by the level detector 701 with a reference value and outputs the result to the controller 703. Then, the controller 703 determines whether a Hi-Fi audio signal is recorded or not using the result of the output from the comparator 702, and controls switching on and off. That is, if the detected level of the signal is greater than the reference value, which means that there is a Hi-Fi audio signal on a video track of a tape to be reproduced, the controller 703 switches off to operate the BRF 603A. Otherwise, the controller 703 switches on not to operate the BRF 603A. While the video/Hi-Fi audio playback signal output from the BRF 603 passes through the equalizer 604A, a color signal is rejected and the frequency characteristics of a luminance signal is compensated for, and then demodulated by the modulator 604A. Also, a luminance signal is rejected from the video/Hi-Fi audio playback signal output from the band rejection filtering portion 603 and a color signal thereof is compensated for by the equalizer 604B, and then demodulated by the demodulator 604D. Then, the demodulated luminance and color signals are mixed by the mixer 604E to output a playback video signal. While in this embodiment the Hi-Fi audio signal recorded on the video track is for L and R channels adopting a two-carrier mode, the Hi-Fi audio signal recorded may be a mono Hi-Fi audio signal of a single-carrier mode. If so, the band pass filtering portion 605 and the Hi-Fi audio signal demodulating portion 606 would be constructed by a single BPF and a single demodulator, respectively.

As described above, a Hi-Fi audio signal can be recorded and reproduced together with a video signal using video heads and video pre-amplifiers, without an extra head and preamplifier for just a Hi-Fi audio signal, thereby markedly lowering the manufacturing cost.

What is claimed is:

1. A recording and playback apparatus, comprising:
    recording means for recording a modulated video signal and a modulated high fidelity audio signal using video heads, said recording means comprising:
        a first mixer for mixing the modulated video signal and the modulated high fidelity audio signal to output a mixed video/audio signal to be recorded;
        a recording amplifier for receiving the mixed video/audio signal to amplify the mixed video/audio signal with a predetermined gain required for the recording; and
        heads for generating a magnetic field by receiving the output signal of the recording amplifier to simultaneously record the video signal and the high fidelity audio signal on a video track; and
    reproducing means for reproducing a video signal and a high fidelity audio signal recorded on a video track of a recording medium using the same heads, comprising:
        said heads simultaneously reading the video signal and the high fidelity audio signal recorded on the video track;
        a switched amplifying portion having first and second amplifiers for respectively amplifying the video signal and high fidelity audio signal, read by the heads, with a predetermined gain, a third amplifier, and a first switch for selectively applying the amplified video signal and the amplified high fidelity audio signal to said third amplifier in response to a head switching signal;
        a band pass filtering portion for passing only the high fidelity audio signal of the output signal from said third amplifier of the switched amplifying portion;
        a band rejection filtering portion including a firsthand rejection filter coupled in parallel with a second switch, said first band rejection filter rejecting the frequency band of the high fidelity audio signal of the output signal from the switched amplifying portion;
        a switch controlling portion for opening the second switch, only when the high fidelity audio signal is detected, to allow band rejection filtering by said first band rejection filter, and for closing the second switch, when the high fidelity audio signal is not detected, to bypass the band rejection filtering;
        a high fidelity audio signal demodulating portion for demodulating the output signal of the band pass filtering portion; and
        a video signal reproducing portion for separately demodulating a modulated luminance signal and a modulated color signal included in the output signal of the band rejection filtering portion, and for mixing the separately demodulated signals.

2. The apparatus of claim 1, wherein the switch controlling portion comprises:
    a level detector for detecting the level of the high fidelity audio signal passed by the band pass filtering portion;
    a comparator for comparing the level of the output signal detected by the level detector with a predetermined reference value; and
    a controller for generating a switching control signal which is for opening the second switch if the level of the output signal is greater than the predetermined reference value, and for closing the second switch if the level of the output signal is not greater than the predetermined reference value.

3. The apparatus of claim 1, wherein the modulated video signal input to the first mixer is the mixed signal of a modulated luminance signal and a modulated color signal, from which the signal of the frequency band corresponding to the high fidelity audio signal has been rejected by a second band rejection filter.

4. The apparatus of claim 1, wherein the modulated high fidelity audio signal is a single carrier signal.

5. The apparatus of claim 1, wherein the modulated high fidelity audio signal is a signal having a plurality of carriers.

6. The apparatus of claim 1, wherein the band pass filtering portion comprises:
    a first band pass filter for passing only the high fidelity audio signal of a L channel of the output signal from the switched amplifying portion; and a second band pass filter for passing only the high fidelity audio signal of a R channel of the output signal from the switched amplifying portion.

7. The apparatus of claim 6, wherein high fidelity audio signal demodulating portion comprises first and second demodulators for demodulating the high fidelity audio signals of the L and R channels, respectively output from the first and second band pass filters.

8. The apparatus of claim 1, wherein the high fidelity audio signal recorded on the video track has a plurality of channels, and the band pass filtering portion includes a plurality of filters each for passing a signal corresponding to each channel of the high fidelity audio signal recorded on the video track.

9. The apparatus of claim 8, wherein the band pass filtering portion comprises:
  a first band pass filter for passing only the high fidelity audio signal of a L channel of the output signal from the switched amplifying portion; and
  a second band pass filter for passing only the high fidelity audio signal of a R channel of the output signal from the switched amplifying portion.

10. The apparatus of claim 9, wherein high fidelity audio signal demodulating portion comprises first and second demodulators for demodulating the high fidelity audio signals of the L and R channels, respectively output from the first and second band pass filters.

11. The apparatus of claim 1, wherein the video signal reproducing portion comprises:
  a first equalizer for rejecting a modulated color signal of the output signal from the band rejection filtering portion and for compensating for the frequency characteristics of an attenuated luminance signal;
  a second equalizer for rejecting a modulated luminance signal of the output signal from the band rejection filtering portion and for compensating for the frequency characteristics of an attenuated color signal;
  a first demodulator for demodulating the modulated luminance signal output from the first equalizer;
  a second demodulator for demodulating the modulated color signal output from the second equalizer; and
  a second mixer for mixing the output signals from the first and second demodulators.

12. A recording and playback method, comprising the steps of:
  mixing a modulated video signal and a modulated high fidelity audio signal to output a mixed video/audio signal to be recorded;
  recording the mixed video/audio signal on a video track of a recording medium using video heads;
  simultaneously reading the video signal and the high fidelity audio signal recorded on the video track of said recording medium using the same heads;
  band pass filtering the read video and high fidelity audio signals for passing only the high fidelity audio signal;
  band rejection filtering the read video and high fidelity audio signals for rejecting only the high fidelity audio signal;
  controlling said step of band rejection filtering by opening a first switch, only when the high fidelity audio signal is detected, to allow band rejection filtering by a first band rejection filter, and bypassing the band rejection filtering step by closing the first switch, when the high fidelity audio signal is not detected;
  demodulating the output signal resulting from the band pass filtering and bypassing steps;
  separately demodulating a modulated luminance signal and a modulated color signal included in the output signal resulting from the band rejection filtering step; and
  mixing the separately demodulated luminance and color signals to produce a playback video signal.

13. The method as set forth in claim 12, further comprising the steps of:
  respectively amplifying the video signal and high fidelity audio signal, read by the heads, in first and second amplifiers having predetermined gain; and
  selectively applying the amplified video signal and the amplified high fidelity audio signal s to a third amplifier via a second switch controlled by a head switching signal, prior to said step of band pass filtering.

14. A recording and playback apparatus, comprising:
  a first mixer for mixing a modulated video signal and a modulated high fidelity audio signal to output a mixed video/audio signal to be recorded on a video track of a recording medium using video heads;
  said video heads simultaneously reading the video signal and the high fidelity audio signal recorded on the video track of said recording medium;
  a band pass filter for band pass filtering the read video and high fidelity audio signals and passing only the high fidelity audio signal;
  an audio demodulator for demodulating the high fidelity audio signal passed by the band pass filter;
  a first band rejection filter coupled in parallel with a first switch;
  said first switch being opened to allow band rejection filtering by said first band rejection filter to reject the high fidelity audio signal, when the high fidelity audio signal is detected, and being closed, when the high fidelity audio signal is not detected, to bypass the band rejection filter;
  a pair of video demodulators for separately demodulating a modulated luminance signal and a modulated chrominance signal included in the video signal passed by the band rejection filter or said first switch; and
  a second mixer for mixing the separately demodulated luminance and chrominance signals to produce a playback video signal.

15. The apparatus of claim 14, further comprising a switch controller comprising:
  a level detector for detecting the level of the the high fidelity audio signal passed by the band pass filter;
  a comparator for comparing the level of the output signal detected by the level detector with a predetermined reference value; and
  a controller for generating a switching control signal which is for opening said first switch if the level of the output signal is greater than the predetermined reference value, and for closing said first switch if the level of the output signal is not greater than the predetermined reference value.

16. The apparatus of claim 14, wherein the band pass filter comprises:
  a L channel band pass filter for passing only the high fidelity audio signal of a L channel; and
  a R channel band pass filter for passing only the high fidelity audio signal of a R channel.

17. The apparatus of claim 16, said audio demodulator comprising:

a first audio demodulator for demodulating the L channel high fidelity audio signal passed by the L channel band pass filter; and a second audio demodulator for demodulating the C channel high fidelity audio signal passed by the C channel band pass filter.

18. The apparatus of claim 14, further comprising:

first and second amplifiers having predetermined gain for respectively amplifying the video signal and high fidelity audio signal read by the heads; and a third amplifier connected to said first and second amplifiers via a second switch for selectively applying the amplified video signal and the amplified high fidelity audio signal, said second switch being controlled by a head switching signal, and an output of said third amplifier being connected in common to inputs of said band pass filter, said first band rejection filter and said first switch.

19. The apparatus of claim 14, further comprising:

a video mixer for mixing a modulated luminance signal and a modulated chrominance signal;

a second band rejection filter coupled to the output of said video mixer for removing a portion of the signal of the frequency band corresponding to the high fidelity audio signal, said second band rejection filter outputting said modulated video signal to said first mixer; and an audio mixer for mixing a modulated high fidelity L channel audio signal and a modulated high fidelity R channel audio signal to output said modulated high fidelity audio signal to said first mixer.

20. The apparatus of claim 14, further comprising:

a first equalizer for rejecting a modulated chrominance signal of the output signal from said first band rejection filter or said first switch and for compensating for the frequency characteristics of an attenuated luminance signal;

a second equalizer for rejecting a modulated luminance signal of the output signal from said first band rejection filter or said first switch and for compensating for the frequency characteristics of an attenuated chrominance signal.

* * * * *